UNITED STATES PATENT OFFICE.

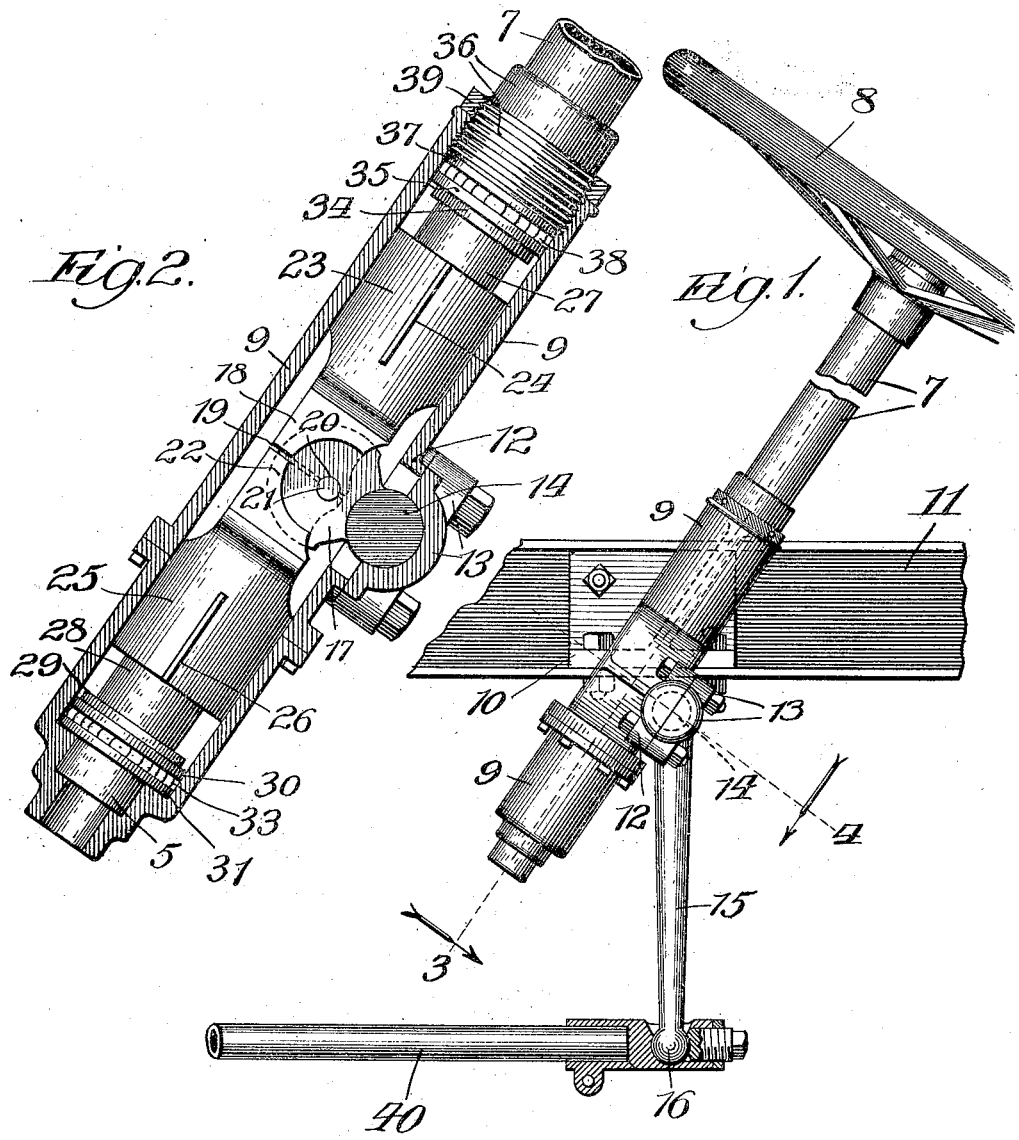

GEORGE A. GEMMER, OF WABASH, INDIANA, ASSIGNOR TO THE GEMMER MANUFACTURING COMPANY, OF DETROIT, MICHIGAN, A CORPORATION OF MICHIGAN.

STEERING-GEAR FOR MOTOR-VEHICLES.

No. 861,104.      Specification of Letters Patent.      Patented July 23, 1907.

Application filed July 23, 1906. Serial No. 327,355.

*To all whom it may concern:*

Be it known that I, GEORGE A. GEMMER, a citizen of the United States, residing at Wabash, in the county of Wabash and State of Indiana, have invented a new and useful Improvement in Steering-Gears for Motor-Vehicles, of which the following is a specification.

My object is to provide an improved motor-vehicle steering-mechanism of a particularly simple, strong, easy working and compact construction; in which the moving parts are well safe-guarded against wear and may be readily tightened, to take up wear when necessary.

Figure 3:
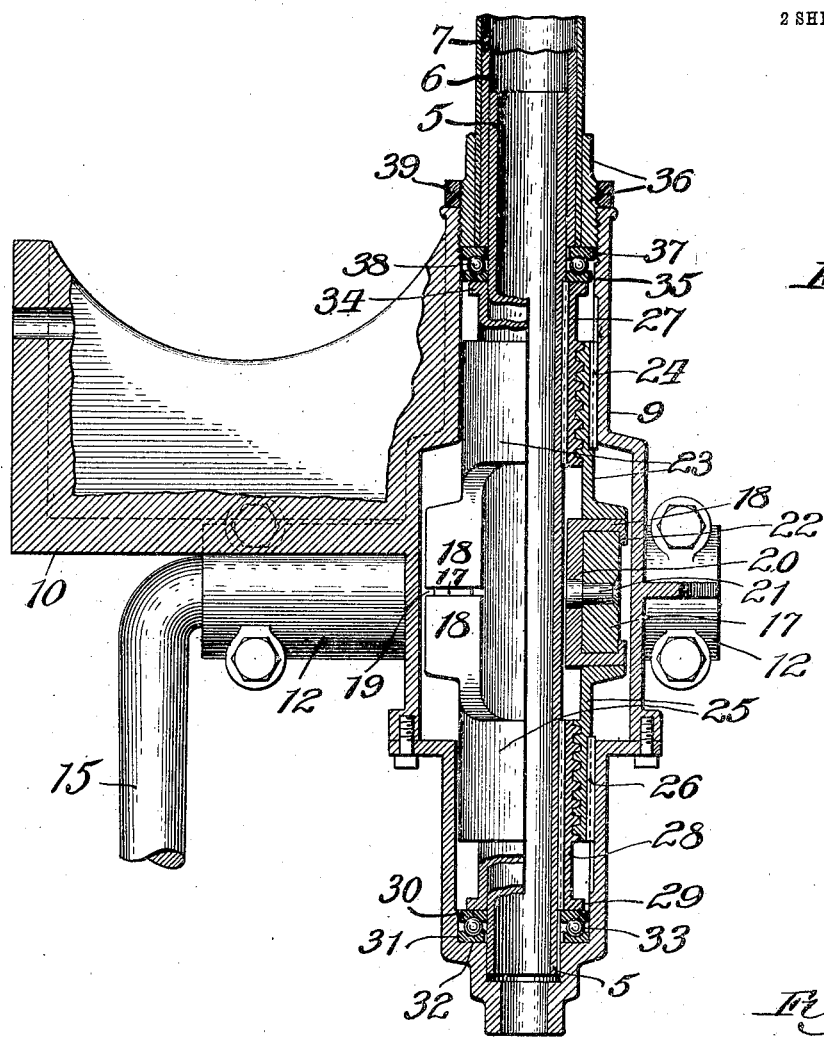

In the drawings—Figure 1 is a broken view, with certain parts in section and showing my improved steering-mechanism in operative position; Fig. 2, a longitudinal section taken at right angles to the section shown in Fig. 3, which latter is a section taken on line 3 in Fig. 1 and enlarged; and Fig. 4, an enlarged plan section taken on line 4 in Fig. 1.

Figure 4:
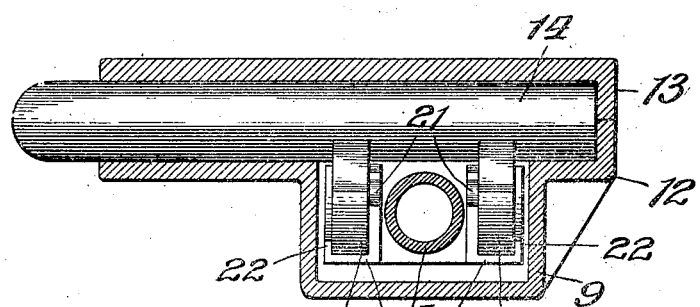

5 is the main steering tube, or column, to which is brazed a tube, or handle, 6 having a jacket, or covering-tube, 7, and carrying the steering-wheel 8. The casing 9 is formed with one or more suitably disposed side brackets 10, at which it is rigidly secured to the under-frame 11 of the machine. On one side of the casing, in the position shown, is a journal-box 12 with a cap 13 forming a bearing for a rock-shaft 14, provided at one end with an arm, or crank-extension, 15 terminating in a bearing-ball 16. The end of the journal-box, opposite the crank 15, is closed, as shown in Fig. 4, to render it dust-proof. Integral with the shaft 14, in the position shown, is a pair of short levers or cranks 17 extending part way across the interior of the casing 9, at opposite sides of the tube, or steering-column, 5. The cranks 17 are segmental as shown, and each fits into a segmental bearing-recess in a shoe 18. Each shoe 18 is formed of two rectangular members spaced normally slightly apart, as indicated at 19. In the adjacent edges of the members, in the positions shown, are registering segmental sockets forming a bearing-opening 20 for a pin, or stud, 21 passing through the adjacent crank 17 and fastened thereto. Each shoe 18 has the crank-retaining flanges 22. Bearing against the upper surfaces of the shoes 18 is a sliding nut 23 fitting loosely the inner wall of the casing and held against rotation by a key 24. Bearing against the under surfaces of the shoes is a sliding nut 25, also fitting loosely the inner wall of the shell and held against rotation by a key 26. The shoe-bearing edges of the nuts 23, 25 are enlarged as shown, to present bearing-surfaces on which the shoes, clamped between them, may slide laterally as they are raised and lowered by the nuts. Both the nuts have inner threads of similar pitch and direction. In other words, they are both either right-hand or left-hand threads of the same pitch.

Surrounding the tube, or column 5, and keyed thereto (not rigidly, but in a manner to admit of adjustment to take up wear), is an upper externally threaded part, or sleeve, 27 engaging the nut 23; and rigidly keyed to the tube 5 is a lower part, or sleeve, 28 externally threaded and engaging the nut 25. The lower end of the sleeve 28 has an annular flange 29 resting upon the upper ball-race member 30. The lower, companion, ball-race member 31 rests upon an annular shoulder 32 of the casing around the lower-end portion of the steering-tube 5. Confined between the members 30, 31 are balls 33. The upper-end portion of the sleeve 27 has an annular flange 34 on which rests a lower ball-race member 35.

Entering the threaded upper end portion of the casing 9 is an adjusting nut 36 which, at its lower end, bears against the upper race-member 37, which, with the lower race-member 35, confines the balls 38. Surrounding the adjusting nut is a jam-nut 39 which may be tightened against the upper end of the casing to lock the adjusting nut. While the sleeve 28, and sleeve 27 normally, are held against longitudinal movement upon, and to rotate with, the steering-tube 5, the nuts 23, 25 are free to rise and descend upon the keys, or feathers, 24, 26, which hold them against rotation.

In operation, turning of the steering-wheel 8 in one direction rotates the steering-tube 5 on the ball-bearings at the upper and lower end portions of the casing, and turns the sleeves 27, 28 in the direction of raising the nuts 24, 25 simultaneously. In the rise of the nuts, the shoes 18 and cranks 17 are raised to rock the shaft 14 and swing the arm, or crank, 15 in one direction. Turning of the steering wheel 8 in the contrary direction causes the nuts and shoes to descend and swing down the crank-arms 17 and rock the shaft in the contrary direction. In the swinging of the cranks 17, the shoes 18 slide back and forth in the bearings formed by the adjacent ends of the nuts 23, 25. The swinging of the arm, or crank, 15 thrusts or draws the rod 40, by means of which the wheels of the vehicle are guided. The pins 21 engaging the openings 20 lock the shoe-sections to slide together, and prevents their displacement.

It will be seen from the construction that the steering tube, or column, 5 is supported throughout a comparatively long stretch and both above and below the shaft 14, and as all the strain is along a central line, the construction is particularly strong and durable.

In practice, the wear between the pins 21 and their bearing-openings 20 would at least equal the wear between the cranks 17 and crank-bearing surfaces of the shoes, so that by simply tightening the nut 36 any wear between the segmental and threaded bearing-surfaces may be quickly and easily taken up, thereby avoiding lost motion between the steering-wheel and shaft 14.

The upper and lower ball-bearings, described, contribute materially toward the ease of turning of the steering-tube, and toward guarding against unequal wear of relatively moving parts.

What I claim as new, and desire to secure by Letters Patent, is—

1. In a steering-mechanism, the combination with a non-rotary casing, of a rotary steering-column therein carrying upper and lower similarly threaded parts longitudinally spaced apart, sliding nuts on said parts held against rotating in the casing, a rock-shaft journaled in the casing, and rocking means for the shaft between the said nuts.

2. In a steering-mechanism, the combination with a non-rotary casing, of a rotary steering-column therein having upper and lower similarly threaded parts, one adjustable relative to the other, sliding nuts on said parts held against rotating in the casing, and a rocking crank-shaft having an operating crank loosely confined between said nuts.

3. In a steering-mechanism, the combination with a non-rotary casing, of a rotary steering-column journaled therein having upper and lower similarly threaded sleeve-portions, sliding nuts on said sleeves held against rotating in the casing, a sliding shoe confined between the said nuts, and a rock-shaft having an operating crank engaged by said shoe.

4. In a steering-mechanism, the combination with a non-rotary casing, of a rotary steering-column journaled therein having upper and lower similarly threaded sleeves, sliding nuts on said sleeves held against rotating in the casing, a sliding shoe formed of separate members confined between said nuts and having a socket, a rock-shaft journaled in said casing, and an operating lever on the rock-shaft extending into said socket.

5. In a steering-mechanism, the combination with a non-rotary casing, of a rotary steering-column journaled therein having upper and lower similarly threaded sleeves, sliding nuts on said sleeves held against rotating in the casing, a sliding shoe formed of separate members confined between said nuts, and having an inner segmental bearing surface forming a socket, a rock-shaft journaled in said casing, and a segmental operating lever for the shaft fitting said socket.

6. In a steering-mechanism, the combination with a non-rotary casing, of a rotary steering-column journaled therein having upper and lower similarly threaded sleeves, sliding nuts on said sleeves held against rotating in the casing, a sliding shoe formed of separate members confined between said nuts and having an inner segmental bearing surface forming a socket, a rock-shaft journaled in the casing, a segmental operating lever for the shaft fitting said socket, and a pivot-pin on the lever engaging registering segmental openings in the shoe members.

7. In a steering-mechanism, the combination with a non-rotary casing, of a rotary steering-column journaled therein having upper and lower similarly threaded sleeves, sliding nuts on said sleeves held against rotating in the casing, a sliding shoe formed of separate members confined between said nuts and having an inner segmental bearing surface forming a socket, a rock-shaft journaled in the casing, a segmental operating lever for the rock-shaft fitting said socket, and lever-retaining flanges on said members.

8. In a steering mechanism, the combination with a non-rotary casing, of a rotary steering-column journaled therein having upper and lower similarly threaded sleeves, sliding nuts on said sleeves held against rotating in the casing, a sliding shoe formed of separate members confined between said nuts and forming a socket, a rock-shaft journaled in said casing, an operating lever for the rock-shaft engaging said socket, ball-bearings for the column at the upper and lower ends of said sleeves, and an adjusting nut in one end of the casing bearing against the adjacent ball-bearing to clamp all the moving parts together and adjustable to take up wear between said parts.

GEORGE A. GEMMER.

In presence of—
E. L. ROGERS,
WILL H. ANDERSON.